United States Patent [19]

Ong et al.

[11] Patent Number: 5,531,956
[45] Date of Patent: Jul. 2, 1996

[54] RIBBED ELECTRODES FOR MOLTEN CARBONATE FUEL CELLS

[75] Inventors: Estela T. Ong, Chicago; Nellie Burton-Gorman, Justice, both of Ill.

[73] Assignee: Institute of Gas Technology, Des Plaines, Ill.

[21] Appl. No.: 429,718

[22] Filed: Apr. 27, 1995

[51] Int. Cl.$^6$ ................................................. B22F 7/00
[52] U.S. Cl. ........................ 419/2; 419/5; 419/8; 419/9; 419/36; 419/41
[58] Field of Search ................. 419/2, 5, 8, 9, 419/36, 41; 429/16, 30, 31

[56] References Cited

U.S. PATENT DOCUMENTS

| | | | |
|---|---|---|---|
| 4,115,627 | 9/1978 | Christner et al. | 429/44 |
| 4,165,349 | 8/1979 | Sandelli | 264/29.1 |
| 4,245,009 | 1/1981 | Guthrie | 429/16 |
| 4,654,136 | 3/1987 | Dang et al. | 204/283 |
| 4,857,420 | 8/1989 | Maricle | 429/30 |
| 5,139,896 | 8/1992 | Smith et al. | 429/40 |
| 5,175,062 | 12/1992 | Farooque et al. | 429/20 |
| 5,185,020 | 2/1993 | Satoh et al. | 68/3.11 |
| 5,227,256 | 7/1993 | Marianowski et al. | 429/16 |
| 5,238,755 | 8/1993 | van Beijnen et al. | 429/40 |
| 5,336,570 | 8/1994 | Dodge, Jr. | 429/31 |

FOREIGN PATENT DOCUMENTS 6176764  9/1994  Japan ............................... H01M 4/86

*Primary Examiner*—Donald P. Walsh
*Assistant Examiner*—John N. Greaves
*Attorney, Agent, or Firm*—Speckman, Pauley & Fejer

[57] ABSTRACT

A method for producing a ribbed electrode for a fuel cell including the steps of depositing a suspension of a powdered electrode metal onto the face of a substantially flat porous electrode metal substrate, forming a plurality of raised structures on the face of the electrode, and sintering the electrode.

9 Claims, No Drawings

RIBBED ELECTRODES FOR MOLTEN CARBONATE FUEL CELLS

BACKGROUND OF THE INVENTION

Field of the Invention

This invention relates to a method for preparing a fuel cell electrode having a plurality of raised structures on a face of the electrode, which eliminates a need for corrugated fuel cell separator plates.

Description of Prior Art

Corrugated fuel cell separator plates are used in molten carbonate fuel cell stacks to separate a cathode of one fuel cell from an anode of an adjacent fuel cell, and to provide gas distribution channels. Such gas distribution channels allow gaseous fuel to contact an anode positioned against one face of the separator plate, and gaseous oxidant to contact a cathode positioned against an opposite face of the separator plate. Corrugated separator plates are complex and costly structures, particularly when compared to planar, noncorrugated separator plates. Because fuel cell stacks can comprise approximately 600 separate fuel cells, and thus may require 600 complex and costly corrugated separator plates, the overall cost of such a fuel cell stack can be greatly diminished if flat separator plates can be used in place of corrugated separator plates.

U.S. Pat. No. 5,139,896 teaches an all-ceramic molten carbonate fuel cell having a composition formed of a multivalent metal oxide or oxygenate such as an alkali metal, transition metal oxygenate. The structure includes an anode and cathode separated by an electronically conductive interconnect. The cathode, separator, anode component is provided with gas channels cast into the porous electrodes for distribution of the fuel cell gases between the electrodes and the separator. However, no method for producing such gas channels is taught by this reference.

Japanese reference 60-185367 teaches a seal for a fuel cell created by hot pressing two flourocain films having different melting points at a temperature between the two melting points with the film having the lower melting point being in contact with the cell.

U.S. Pat. No. 5,227,256 teaches a fully internal manifolded fuel cell stack which uses a corrugated separator plate to separate adjacent fuel cells. U.S. Pat. No. 5,175,062 teaches a reforming unit assembly for reforming hydrocarbon fuel for a molten carbonate fuel cell of a fuel cell stack in which the reforming unit comprises a housing and an integrating unit for integrating the housing with the adjacent fuel cells in the stacks.

It is apparent that novel a method for producing fuel cell electrodes which achieves fuel cell gas distribution across the face of the electrode, and which eliminates the need for costly and complex corrugated separator plates is desirable.

SUMMARY OF THE INVENTION

It is one object of this invention to provide a method for producing an electrode for a fuel cell that eliminates a need for corrugated or otherwise channelled fuel cell separator plates in a fuel cell.

It is another object of this invention to provide a method for producing an electrode for a fuel cell that reduces the cost of producing a fuel cell.

These and other objects are achieved, according to one preferred embodiment of this invention, by a method for producing an electrode for a fuel cell that comprises depositing a suspension comprising at least one powdered metal onto a face of a substantially flat porous electrode metal substrate, forming a plurality of raised structures on the face of the electrode. The porous electrode metal substrate with said raised structures is then sintered to form the final product. In an assembled fuel cell, such raised structures create a plurality of channel-like voids between the electrode and a flat separator plate, thereby permitting efficient fuel cell gas distribution, and eliminating the need for a complex and costly separator plate of the type often used in conventional fuel cells.

In accordance with one embodiment of the process of this invention, the electrode substrate is passed through a plurality of continuous flowing streams of the powdered metal suspension, forming a plurality of ribbed structures on the face of the electrode substrate. In accordance with another embodiment of this invention, the electrode substrate is passed through a plurality of discontinuous streams of the powdered metal suspension, forming a plurality of discontinuous pod-like structures on the surface of the electrode substrate.

According to another embodiment of this invention, a perforated plate is positioned on a face of the electrode substrate, and the perforations are filled with the powdered metal suspension. The perforated plate is removed from the electrode substrate after a suitable set-up time, leaving a plurality of mounds on the face of the electrode substrate.

According to yet another embodiment of this invention, the powdered metal suspension is extruded to form a plurality of elongated structures that are attached to a face of the electrode metal substrate. The extruded structures are preferably attached to the electrode metal substrate with a bonding suspension.

DESCRIPTION OF PREFERRED EMBODIMENTS

According to one preferred embodiment of this invention, the powdered metal suspension is deposited on a substantially flat electrode substrate to form a plurality of raised structures on a face of the electrode substrate. Deposit of the powdered metal suspension onto the flat electrode substrate is achieved by passing the flat electrode substrate horizontally beneath a plurality of flowing streams of the powdered metal suspension, thereby forming continuous raised structures extending substantially across the face of the flat electrode substrate and forming gas distribution channels between said raised structures.

Ribbed electrodes for a fuel cell are produced in accordance with the process of this invention by setting a powdered metal suspension on a face of a flat, pre-dried, porous metal electrode substrate to form raised structures thereon, which raised structures extend to contact a flat separator plate disposed between fuel cell units of a fuel cell stack, thereby providing a void between the separator plate and the electrode substrate which enables the distribution of fuel cell gases (fuel and oxidant) over the separator plate and electrode surfaces. The powdered metal suspension preferably comprises a metal, similar to, or the same as, the metal of the electrode substrate, suspended in a liquid vehicle of variable viscosity.

In accordance with one embodiment of this invention, a container having a plurality of through bores is filled with the powdered metal suspension and passed over the electrode substrate to form a plurality of ribs on the electrode substrate. In accordance with another embodiment, the electrode substrate is passed through a plurality of streams of powdered metal suspension flowing from a relatively or completely nonmoving container. The container and the electrode substrate can move linearly with respect to each other to form generally linear ribs on the electrode substrate. Alternatively, the container and the electrode substrate can move nonlinearly with respect to each other, thereby forming waved, circular or any desired rib pattern on the electrode substrate.

In accordance with one embodiment of the process of this invention, the container through bores can be opened and closed, and thus can create continuous rib-like patterns or discontinuous pod-like structures on the electrode substrate face. Thus, a wide variety of rib patterns, sizes and shapes can be produced by varying the flow characteristics of the powdered metal suspension, the sizes of the holes in the container, the container or electrode substrate movement pattern, and the movement speed.

In accordance with another preferred embodiment of the process of this invention, a perforated plate or template is positioned on the face of the electrode substrate, and the perforations are filled with the powdered metal suspension. After a suitable set-up time, the perforated plate is lifted from the face of the electrode substrate, leaving a plurality of raised mounds on the electrode substrate. It is apparent that a plate can be constructed to have perforations of any desired shape and pattern, and accordingly, the mounds on the electrode substrate can be any desired shape and pattern.

To control the height of the raised mounds, the thickness of the perforated plate can be varied. According to one preferred embodiment of this invention, the perforated plate has a suitable uniform thickness to provide mounds having a height of about 20–300 mils.

In accordance with yet another embodiment of the process of this invention, a thickened mixture of the powdered metal suspension is extruded to form long, thin and malleable strips of electrode material. These extruded structures can have any suitable cross section. The extruded structures are secured on the face of the electrode substrate with a bonding suspension or other suitable means known to those skilled in the art.

The electrode substrate containing the raised structures is then preferably sintered to increase the bonding of the raised structures to the face of the electrode substrate, and to strengthen the entire electrode.

Example I

A ribbed cathode was constructed by depositing parallel streams of cathode material suspended in a liquid over a flat, pre-dried cathode. The ribbed structures adhered well to the cathode after drying. The composition of the metal powder suspension was as follows:

Carbonyl Nickel 352 g

Methocel 400 12 g

Deionized Water 315 g

Tributyl Phosphate 5.5 g

Ethylene Glycol 5.5g

Propanol 85 g

TOTAL WEIGHT 775 g

The metal powder suspension was prepared by combining and impeller-mixing all of the ingredients except carbonyl nickel for 20 minutes. The carbonyl nickel was then slowly added to the mixture and impeller-mixed at high speed for 40 minutes. (Prior to depositing the metal powder suspension on an electrode substrate, the metal powder suspension should be freshly remixed for 10 minutes.)

Example II

A ribbed electrode according to another embodiment of the process of this invention was constructed by attaching a plurality of elongated, extruded strips of cathode material to the face of a flat, pre-dried cathode in a parallel pattern with a thin, dilute suspension of cathode bonding material. A similar extruded strip material was also attached with the bonding suspension around the perimeter portion of the cathode face to create a peripheral seal between the cathode and the adjacent flat separator plate of a fuel cell stack, and thus prevent gas leakage.

The composition of the metal powder extrusion compound was as follows:

Carbonyl Nickel 351 g

Methocel 400 12.15 g

Deionized Water 230.85 g

Tributyl Phosphate 26 g

Ethylene Glycol 9 g

TOTAL WEIGHT 629 g

The metal powder extrusion compound was prepared by combining and hand-stirring the ingredients. The compound was then placed into a plastic bag and hand-kneaded to a smooth consistency. (The compound should be stored in a tightly sealed container until it is extruded.)

The composition of the metal powder bonding suspension used was as follows:

Carbonyl Nickel 50 g

CB-131 50 g (commercial binder formula for tape casting)

Methylene Chloride 20 g

TOTAL WEIGHT 120 g

The bonding suspension was prepared by combining and impeller-mixing the ingredients for 10 minutes. The bonding suspension was then applied where needed for bonding the extruded strip material.

A ribbed cathode produced in accordance with Example II was first sintered and then tested in a bench-scale molten carbonate fuel cell. The fuel cell comprised an active electrolyte-matrix tape, and a Ni+Cr anode. The extruded strip material attached to the perimeter portion of the cathode face formed a seal between the cathode and the adjacent flat separator plate. The cell open circuit voltage was 1027 mV on a fuel composition of 60 $H_2$/20 $CO_2$/20 $H_2O$ and an oxidant of 30 $CO_2$/70 air humidified at room temperature. The wet seal efficiency for the cathode was 3%. The cell resistance was very high, approximately 17 ohms, so the fuel cell was not loaded above 60 mA/cm$^2$. The cell was terminated after 310 hours at 650 V.

After the fuel cell was disassembled, the integrity of the cathode remained high. The cathode remained flat and the ribs neither deformed nor significantly flattened. The extruded strips on the perimeter portion of the cathode face remained attached to the cathode face, establishing that a strong bond existed between the extruded strips and the cathode. Although the cell did not perform well, electrochemically, the cause was not due to a faulty fabrication of the ribbed electrode.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for producing an electrode for a fuel cell comprising the steps of:

setting a suspension comprising at least one powdered electrode metal onto a face of a substantially flat pre-dried porous electrode metal substrate, forming a plurality of raised structures of said suspension on said face; and sintering said porous electrode metal substrate and said raised structures.

2. A method in accordance with claim 1, wherein said at least one powdered electrode metal corresponds to said electrode metal of said porous electrode metal substrate.

3. A method in accordance with claim 1, wherein said plurality of raised structures comprises a plurality of ribbed structures.

4. A method in accordance with claim 3, wherein said plurality of ribbed structures is formed by passing said porous electrode metal substrate through a plurality of flowing streams of said suspension.

5. A method in accordance with claim 3, wherein said ribbed structures are formed by extrusion of said suspension, producing a plurality of extruded structures, and said plurality of extruded structures are attached to said face of said porous electrode metal substrate.

6. A method in accordance with claim 5, wherein said extruded structures are bonded to said face of said porous electrode metal substrate with a dilute, liquid suspension of said powdered electrode metal.

7. A method in accordance with claim 1, wherein said plurality of raised structures comprises a plurality of mounds.

8. A method in accordance with claim 7, wherein a perforated plate is positioned on said face of said porous electrode metal substrate, the perforations of said perforated plate are filled with said suspension, and, after a suitable suspension set-up time, said perforated plate is removed from said face of said porous electrode metal substrate, leaving said plurality of mounds on said face of said porous electrode metal substrate.

9. A method in accordance with claim 1, wherein said plurality of raised structures are in the range of about 20 mils to about 300 mils high.

* * * * *